United States Patent
Kondo et al.

(10) Patent No.: US 7,681,303 B2
(45) Date of Patent: Mar. 23, 2010

(54) METHOD FOR MANUFACTURING A MAGNETIC HEAD SLIDER

(75) Inventors: Akira Kondo, Kanagawa (JP); Koji Tanaka, Kanagawa (JP); Kimitoshi Etoh, Kanagawa (JP); Ichiro Oodake, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 258 days.

(21) Appl. No.: 11/897,674

(22) Filed: Aug. 30, 2007

(65) Prior Publication Data
US 2008/0072418 A1 Mar. 27, 2008

(30) Foreign Application Priority Data
Sep. 1, 2006 (JP) .............................. 2006-237601

(51) Int. Cl.
*G11B 5/127* (2006.01)
*H04R 31/00* (2006.01)

(52) U.S. Cl. .............. 29/603.12; 29/603.09; 29/603.13; 29/603.15; 29/603.16; 29/603.18; 360/121; 360/122; 360/317; 451/5; 451/8; 451/10; 451/36; 451/41

(58) Field of Classification Search .............. 29/603.09, 29/603.12–603.16, 603.18; 360/121, 122, 360/317; 451/5, 8, 10, 36, 37, 41
See application file for complete search history.

(56) References Cited

U.S. PATENT DOCUMENTS

| | | | |
|---|---|---|---|
| 5,517,477 A | 5/1996 | Sako | |
| 6,193,584 B1 * | 2/2001 | Rudy et al. | 451/5 |
| 6,532,646 B2 | 3/2003 | Watanuki | |
| 6,884,148 B1 * | 4/2005 | Dovek et al. | 451/5 |
| 2002/0009294 A1 | 1/2002 | Nishimura | |
| 2002/0064379 A1 | 5/2002 | Kawashima et al. | |
| 2005/0237673 A1 | 10/2005 | Mizoguchi et al. | |
| 2006/0028770 A1 | 2/2006 | Etoh et al. | |
| 2006/0039672 A1 | 2/2006 | Yamada et al. | |

FOREIGN PATENT DOCUMENTS

| | | |
|---|---|---|
| JP | 07-121313 | 5/1995 |
| JP | 10-188495 | 7/1998 |

(Continued)

*Primary Examiner*—Paul D Kim
(74) *Attorney, Agent, or Firm*—Townsend and Townsend and Crew LLP; Rambod Nader

(57) ABSTRACT

Embodiments of the present invention provide a method of manufacturing a magnetic head slider, the method being adapted so that throat height of a main magnetic pole piece of a perpendicular recording magnetic head can be controlled with high accuracy. According to one embodiment, a first Electrical Lapping Guide element (ELG) is disposed on the same layer as a plated underlayer of a shield of one write head in a row bar, and other ELGs are disposed on the same layer as that of a main magnetic pole piece of another write head. Front end positions (Tops) are detected from changes in resistance values of the other ELGs and an ending position of lapping is calculated. Since the front end positions (Tops) of the other ELGs are accurate, it is possible to assign a correlation to throat height "Th" of the main magnetic pole piece and the resistance value of the first ELG by detecting this resistance value existing when the front end positions (Tops) are detected.

8 Claims, 12 Drawing Sheets

FOREIGN PATENT DOCUMENTS

| | | |
|---|---|---|
| JP | 11-205157 | 7/1999 |
| JP | 2000-067408 | 3/2000 |
| JP | 2005-056519 | 3/2005 |
| JP | 2005-317069 | 11/2005 |
| JP | 2005-339598 | 12/2005 |
| JP | 2006-048806 | 2/2006 |

* cited by examiner

Air bearing shape    Sectional shape

METHOD FOR MANUFACTURING A MAGNETIC HEAD SLIDER

CROSS-REFERENCE TO RELATED APPLICATION

The instant nonprovisional patent application claims priority to Japanese Patent Application No. 2006-237601 filed Sep. 1, 2006 and which is incorporated by reference in its entirety herein for all purposes.

BACKGROUND OF THE INVENTION

Magnetic disk drives for use as the external storage devices of information-processing apparatuses such as computers are required to have higher recording capacities, and are therefore improved primarily in recording density in order to meet this requirement. Enhancing density by using a conventional longitudinal magnetic recording scheme, however, poses the problem that since a large diamagnetic field occurs in the transition region of magnetization on the medium, reduction in the recording layer film thickness thereof is required and recorded data is consequently lost by thermal confusion. Meanwhile, for the perpendicular magnetic recording scheme where a recording magnetization process for the medium is conducted in its film thickness direction, high recording density is easy to achieve, since the diamagnetic field occurring in the magnetization transition region is small and thus since the necessity for the reduction in the film thickness of the medium is not too substantial.

When a signal is recorded on a perpendicular recording medium by using a perpendicular recording magnetic head, the electrical signal is converted into a magnetic signal by a coil and thus the main and subsidiary magnetic pole pieces of the head are excited to generate magnetic fluxes. Part of these magnetic fluxes flow from the subsidiary magnetic pole piece and after moving past the area between the main and subsidiary magnetic pole pieces, penetrate the perpendicular recording layer of the recording medium. After this, a closed loop is formed that returns to the subsidiary magnetic pole piece through the soft magnetic underlayer located below the perpendicular recording layer. At this time, the subsidiary magnetic pole piece is used to return the magnetic fluxes that have occurred at the perpendicular recording layer and soft magnetic underlayer of the recording medium, from the main magnetic pole piece to the subsidiary magnetic pole piece efficiently and magnetically. The magnetic fluxes flow in this manner to record a magnetizing signal on the perpendicular recording medium.

To improve recording density in the perpendicular recording scheme, it is necessary to process the element height of the read head and that of the write head very accurately. Japanese Patent Publication No. 2006-48806 ("Patent Document 1") describes a technique that allows both the element height (throat height) of a write head and the element height (sensor height) of a read head to be controlled by using the procedure below. First, a special detection pattern for air bearing surface processing of the read head and a special detection pattern for air bearing surface processing of the write head are provided in respective sections that operate as sliders. Next, the air bearing surface of the write head is lapped while the element height (throat height) thereof is being monitored by using the detection pattern for air bearing surface processing, and during this monitoring process, the special detection pattern for air bearing surface processing of the read head as well is monitored. It is also described that during air bearing surface lapping of the write and read heads, the resistance values of the processing detection patterns for the heads are checked and if the throat height of the write head is found to be large in comparison with the sensor height of the read head, the air bearing surface of the write head is lapped at a tilt to reduce the throat height thereof.

Japanese Patent Publication No. 2005-317069 ("Patent Document 2") describes a technique that the processing accuracy of throat height TH as well as that of magnetoresistive (MR) element height can be enhanced by using the procedure below. First, on the air bearing surface of a bar, a plurality of first resistive films are provided at the same layer positions as those of the MR element, and a plurality of second resistive films are provided at the same layer positions as those of a recording gap. Next, the resistance values of the first and second resistive films are measured while the air bearing surface of the bar is being lapped, and the amounts of lapping of the air bearing surface in a longitudinal direction and minor-axis direction thereof are controlled on the basis of the respective resistance values of the first resistive films and those of the second resistive films.

Japanese Patent Publication No. 2000-67408 ("Patent Document 3") describes a technique in which, during the lapping of a read head such as an MR head or giant MR head, a first ELG (Electrical Lapping Guide) element larger than the read head in element height and a second ELG element of the same shape as that of the read head are provided. Then the element height of the read head is controlled to be a required dimensional accuracy while being monitored with the first ELG element, and the element resistance value of the read head is controlled to be a required value while being monitored with the second ELG element.

In the above conventional techniques, the throat height of the write head and the sensor height of the read head are controlled by measuring the resistance values of the ELG elements (processing detection patterns) that are correlated with the throat height and the sensor height. There is the problem, however, that since the write head ELG element patterning of the perpendicular recording magnetic head is conducted by ion milling primarily from the air bearing surface side of the write head simultaneously with the formation of the main magnetic pole piece, swarf by ion milling re-sticks to the edge opposite to the air bearing surface of the ELG element and makes the resistance value of this ELG element unstable. If the resistance value of the ELG element becomes unstable and nonuniform, lapping the throat height section of the main magnetic pole piece that is required to be dimensionally accurate cannot be controlled with high accuracy.

Since the front end positions of the write ELGs of a perpendicular recording magnetic head are determined during ion milling from the air bearing surface side simultaneously with the formation of the main magnetic pole piece, fragments of the material lapped will re-stick to the edge at the opposite side to the air bearing surface of each ELG, resulting in unstable ELG resistance values. The instability and nonuniformity of ELG resistance values do not make highly accurate lapping control of the throat height of the main magnetic pole piece.

BRIEF SUMMARY OF THE INVENTION

Embodiments of the present invention provide a method of manufacturing a magnetic head slider, the method being adapted so that throat height of a main magnetic pole piece of a perpendicular recording magnetic head can be controlled with high accuracy. According to the particular embodiment of FIG. 1 of the present invention, an ELG 30 is disposed on the same layer as a plated underlayer 15 of a shield 14 of one write head in a row bar, and ELGs 31, 32 are disposed on the same layer as that of a main magnetic pole piece 12 of another write head. Front end positions (Tops) are detected from changes in resistance values of the ELGs 31, 32, and an ending position of lapping is calculated. Since the front end positions (Tops) of the ELGs 31, 32 are accurate, it is possible to assign a correlation to throat height "Th" of the main magnetic pole piece 12 and the resistance value of the ELG 30 by detecting this resistance value existing when the front end positions (Tops) are detected.

DETAILED DESCRIPTION OF THE INVENTION

Embodiments in accordance with the present invention relate to methods for manufacturing a magnetic head slider.

An object of embodiments of the present invention is to provide a method of manufacturing a magnetic head slider, the method being adapted so that throat height of a main magnetic pole piece of a perpendicular recording magnetic head can be controlled with high accuracy.

In the method of manufacturing a magnetic head slider according to embodiments of the present invention, a first processing detection pattern (ELG) that monitors throat height of a main magnetic pole piece is disposed on the same layer as a plated underlayer of a trailing side shield of one perpendicular recording magnetic head within a robber, and second and third ELGs recessed from a lapped surface of the first ELG are disposed on the same layer as a main magnetic pole piece of another perpendicular recording magnetic head. Front end positions (Tops) of the second and third ELGs are detected from changes in resistance values thereof, and an ending position of lapping of the first ELG is calculated. Since heights of the second and third ELGs at the front end positions (Tops) thereof are accurate, a correlation between the throat height of the main magnetic pole piece and a resistance value of the first ELG can be assigned by detecting this resistance value when the front end positions (Tops) are detected.

Once the throat height of the main magnetic pole piece and the resistance value of the first ELG have been correlated to each other, a shift in position between the throat height of the main magnetic pole piece and the first ELG existing when the slider is manufactured can be corrected. Lapping the throat height section of the main magnetic pole piece can therefore be controlled with high accuracy.

According to embodiments of the present invention, the throat height section of the main magnetic pole piece of the perpendicular recording magnetic head can be controlled with high accuracy.

Figure 11:
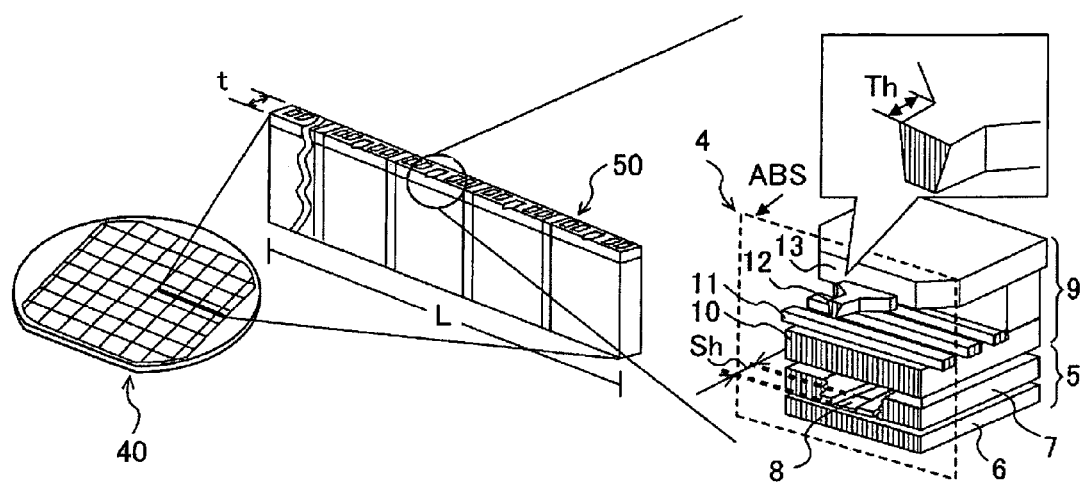
FIG. 11 is a diagram showing a wafer, a row bar that was sliced out from the wafer, and a schematic configuration of a perpendicular recording magnetic head present on the row bar.

First, a configuration of a perpendicular recording magnetic head applying the present invention as an embodiment thereof is described below with reference being made to FIG. 11. FIG. 11 is a diagram showing a wafer 40, a row bar 50 that was extracted from the wafer 40, and a schematic configuration of the perpendicular recording magnetic head 4 on the row bar 50.

The perpendicular recording magnetic head 4 includes a write head 9 and a read head 5. The write head 9 that generates a magnetic field to record information on a recording layer of a magnetic disk not shown, and the head 9 is a monopole magnetic head includes a main magnetic pole piece 12, an auxiliary magnetic pole piece 10, and a thin-film coil 11 interlinked to a magnetic circuit formed by the main magnetic pole piece and the auxiliary magnetic pole piece.

The read head 5 for reading written information from the recording layer of the magnetic disk includes a read element 8, such as a GMR element or a TMR element, that is sandwiched between a pair of upper and lower magnetic shields 6, 7.

During recording, magnetic fluxes that have exited the main magnetic pole piece 12 of the write head 9 pass through the recording layer and soft magnetic underlayer of the magnetic disk, form a magnetic flux path to return to the auxiliary magnetic pole piece 10, and record a magnetization pattern on the recording layer. To implement better read/write operations, the magnetic head 4 requires more accurate processing so as to be appropriate in element height (throat height "Th") of the write head 9 from an air bearing surface (ABS) of its main magnetic pole piece 12 to a flare point and in element height (sensor height "Sh") of the read head 5 from an ABS of its read element 8.

Figure 12:
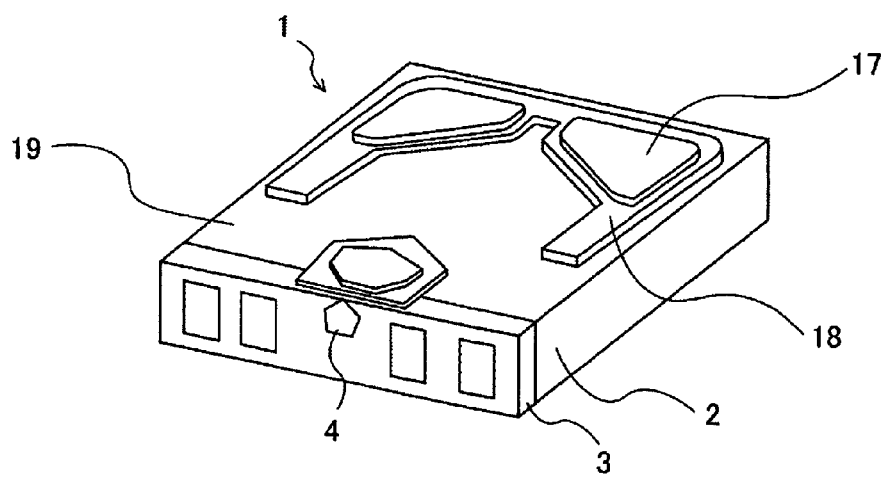
FIG. 12 is a perspective view showing an example of a magnetic head slider configuration.

FIG. 12 shows a configuration of a magnetic head slider 1 having the perpendicular recording magnetic head 4 mounted thereon. The magnetic head slider 1 has a slider 2 and a head element section 3, and the perpendicular recording magnetic head 4 is formed on the head element section 3. An air bearing rail 17, a shallow-trench rail 18, and a deep trench 19 are formed on an air bearing surface of the magnetic head slider 1. The air bearing surface of the magnetic head slider 1 faces the magnetic disk.

Figure 13:
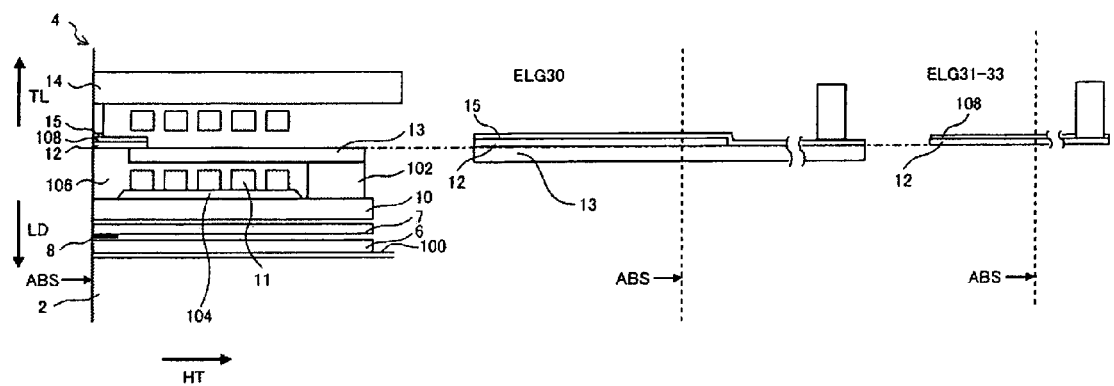
FIG. 13 is a sectional view of a head element section and ELG section of a perpendicular recording magnetic head which has shields on a side of the main magnetic pole piece and at a trailing side thereof.
Figure 14:
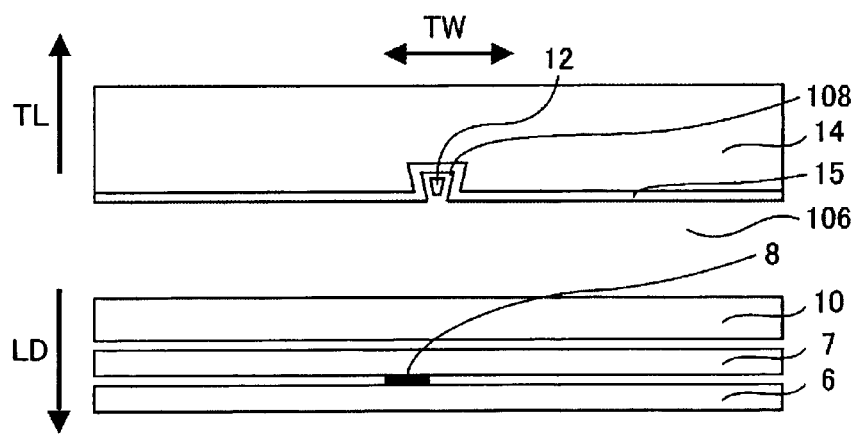
FIG. 14 is a view showing an air bearing surface of the perpendicular recording magnetic head of FIG. 13.
Figure 15:
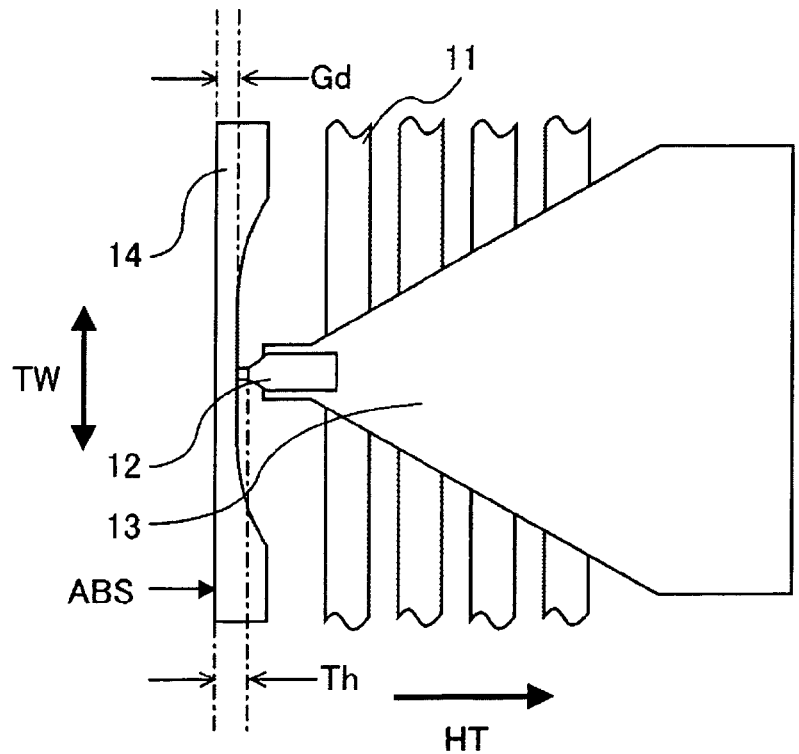
FIG. 15 is a top view of the perpendicular recording magnetic head in FIG. 13.

Next, the configuration of the perpendicular recording magnetic head 4 is described in detail below with reference being made to FIGS. 13, 14, and 15. FIG. 13 is a sectional view of the perpendicular recording magnetic head 4 in a height direction (HT) thereof. FIG. 14 is a view of an air bearing surface (ABS). FIG. 15 is a view in which a surface perpendicular to a film thickness direction of the element in FIG. 13 is shown superimposedly in a leading-edge direction from a lower face of an upper-layer coil. The perpendicular recording magnetic head 4 is constructed such that the read head and the write head are stacked on a substrate 2 of the slider member via a non-magnetic dielectric film 100. The main magnetic pole piece 12 that defines recording track width of the write head is a magnetic film exposed to the ABS. As shown in FIG. 15, a section from the ABS to the throat height "Th" is controlled to be a required width in a direction of track width in order to define the recording track width, whereas a section facing in the height direction of the head from the flare point thereof is formed so as to have a spread. The magnetic film 12 that defines the recording track width is constructed to have a front end whose width at the ABS is a maximum of 0.2 microns. The main magnetic pole piece is formed up of, for example, a plurality of magnetic films constructed by using a sputtering method based on, for example, an permalloy consisting of nickel iron (NiFe) with an Ni content of at least 70%, on a cobalt-iron (CoFe) alloy, a cobalt-nickel-iron (CoNiFe) alloy, or CoFe/NiFe.

For reasons associated with a rotational direction of the magnetic disk, a shape of the section of the disk that the main magnetic pole piece 12 leaves lastly after moving past a certain point on the disk, that is, a shape of a section including an upper face (trailing side) and lateral face of the main magnetic pole piece significantly affects a shape of the magnetization pattern. As shown in FIG. 14, therefore, the main magnetic pole piece 12 is constructed so that, at the air bearing surface, width of the main magnetic pole piece in the track width direction TW at a leading side, that is, width of a lower face of the main magnetic pole piece is smaller than its width in the track width direction at the trailing side, that is, width of the upper face of the main magnetic pole piece. In consideration of a skew angle, a ratio between both (i.e., the width in the track width direction at the leading side/the width in the track width direction at the trailing side) preferably ranges from 0.15 to 0.30, and a particularly preferable taper angle α of an inverted trapezoidal section ranges from 5 to 15 degrees.

In order to achieve efficient induction of the magnetic fluxes, the slider 1 has a magnetic film (yoke) 13 thicker than the main magnetic pole piece 12 and magnetically connected thereto, and the main magnetic pole piece 12 and the subsidiary magnetic pole piece 10 are magnetically interconnected via the yoke 13 and a connecting magnetic pole piece 102. As shown in FIG. 15, the yoke 13 is formed so as to have a spread in the direction of height HT and in the direction of the track width. In order to realize highly efficient generation of a magnetic field which has components oriented perpendicularly to the recording medium, a dielectric film 106 is provided between the main magnetic pole piece 12 and the subsidiary magnetic pole piece 10. Thus, a required magnetic spatial gap is created. The thin-film coil 11 disposed on an underlayer 104 formed by using a dielectric material such as alumina, and the coil 11 is a helical type of coil formed so as to wind around the yoke 13 connected to the main magnetic pole piece 12.

In order to minimize a discrepancy between effective track width and geometrical track width, the write head has a trailing side shield 14 constructed of the magnetic films disposed in the track width direction TW and trailing direction TL of the main magnetic pole piece 12. The trailing side shield 14 is formed on a plated underlayer 15 formed on the dielectric film 106 and around a non-magnetic film 108 which surrounds the main magnetic pole piece 12. A plating method is used to form the trailing side shield 14. The trailing side shield 14 is formed up of two magnetic films whose widths in the height direction differ from each other. One of the two magnetic films is wider than the other, and the wider magnetic film is formed on the narrower one.

As shown in FIG. 15, width of the main magnetic pole piece 12 in the height direction HT, is greater than width of the trailing side shield 14 in the height direction HT, near the main magnetic pole piece. Also, the width ("Gd") of the trailing side shield 14 in the height direction, near the main magnetic pole piece 12, is smaller than the throat height "Th" of the main magnetic pole piece. This is because, if the dimension "Gd" of the trailing side shield 14 adjacent to the main magnetic pole piece 12 via a gap is greater than "Th" and the trailing side shield 14 is too close to the flare point of the main magnetic pole piece 12, the magnetic field will leak from the flare section and reach the trailing side shield 14.

The write head ABS-processing detection patterns (ELGs) in the present embodiment are viewed in the height direction HT, and are shown in sectional view at the right side of the perpendicular recording magnetic head 4 in FIG. 13. The ELG 30 is formed on the same layer as the plated underlayer 15 of the shield 14. Also, the ELGs 31-33 are formed on the same layer as that of the main magnetic pole piece. For reduced resistance, the ELG 30 can be electrically connected to sections formed on the same layer as that which constitutes the yoke 13 and the main magnetic pole piece 12. The non-magnetic film 108 is removed from a region in which the ELG 30 is formed. A method of forming each film, along with the perpendicular recording magnetic head 4, is described below. After the formation of the magnetic film (yoke) 13 by plating, a magnetic film to become the main magnetic pole piece is deposited by sputtering. At this time, the ELGs 30, 31-33 are also formed by sputtering, and each is patterned as well. The non-magnetic film 108 such as alumina is deposited on the region where the magnetic film was formed. The non-magnetic film 108 is then used as a mask to etch the main magnetic pole piece 12 by argon (Ar) ion milling for its inverse tapering. During the etching process, angle adjustments are performed to prevent re-sticking swarf from remaining on the ABS. The magnetic film 12 for the ELGs 31-33 is also ion-milled at the same angle for the ELGs to maintain respective correlations with the patterns of the main magnetic pole piece. In addition, the magnetic film 12 for the ELG 30 undergoes processing similar to the above, but before the plated underlayer 15 is formed, the non-magnetic film 108 is removed to electrically interconnect the magnetic films 12, 13, and the plated underlayer 15. Next, the plated underlayer 15 is deposited by sputtering, and the trailing side shield 14 is formed on the plated underlayer 15 of the perpendicular recording magnetic head 4 by plating. The ELGs 30, 31-33 then have terminals connected thereto via the respective underlayers and/or magnetic layers 12 in order to ensure electrical continuity with respect to outside.

Figure 16:
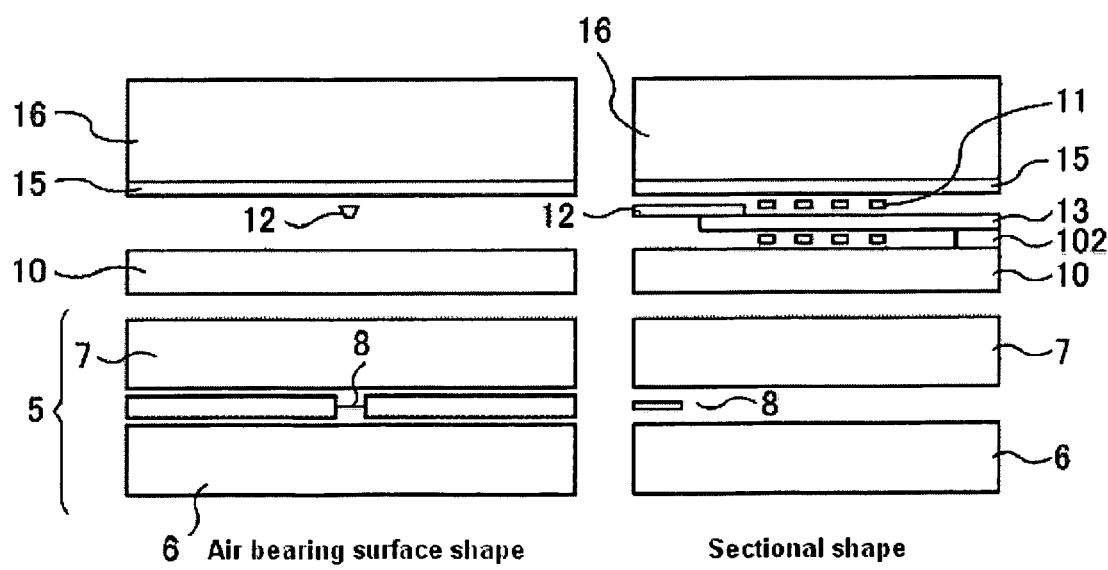
FIG. 16 is a view that shows an air bearing surface shape and sectional shape of a perpendicular recording magnetic head having a shield at the trailing side of the main magnetic pole piece.

The above perpendicular recording magnetic head 4, although constructed to have a trailing side shield 14 around the main magnetic pole piece 12, may have a trailing shield 16, instead of the trailing side shield 14, at the trailing side of the main magnetic pole piece 12, as shown in FIG. 16.

Figure 5:
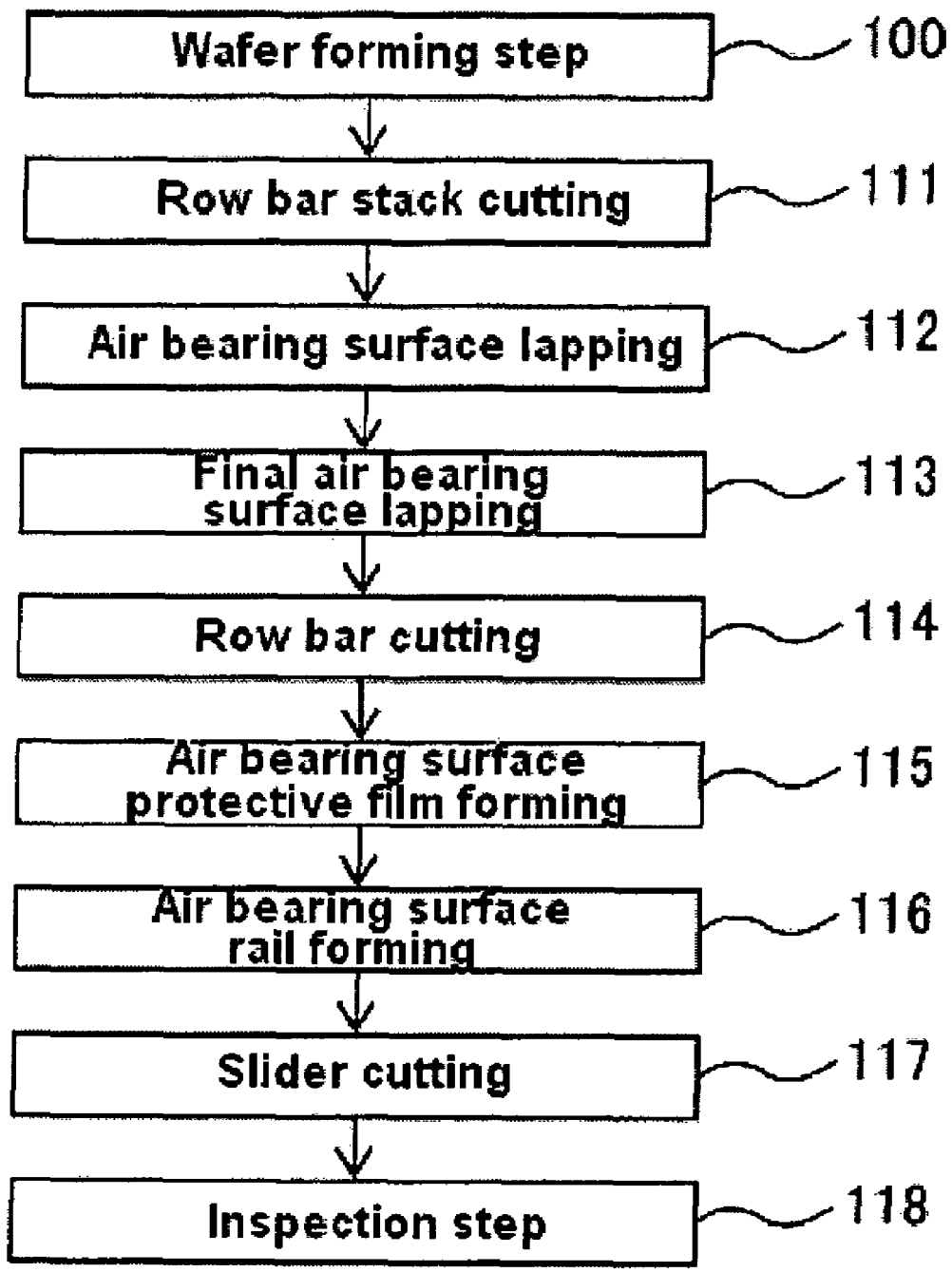
FIG. 5 is a process flow diagram of a manufacturing method for a magnetic head slider according to the embodiments of the present invention.

Next, a method of manufacturing the magnetic head slider according to the present embodiment, the method including an air bearing surface lapping process adapted for highly accurate control of the throat height "Th" and the sensor height "Sh", is described below with reference being made to FIG. 5. Reference is also to be made to FIGS. 11 to 16.

Figure 1:
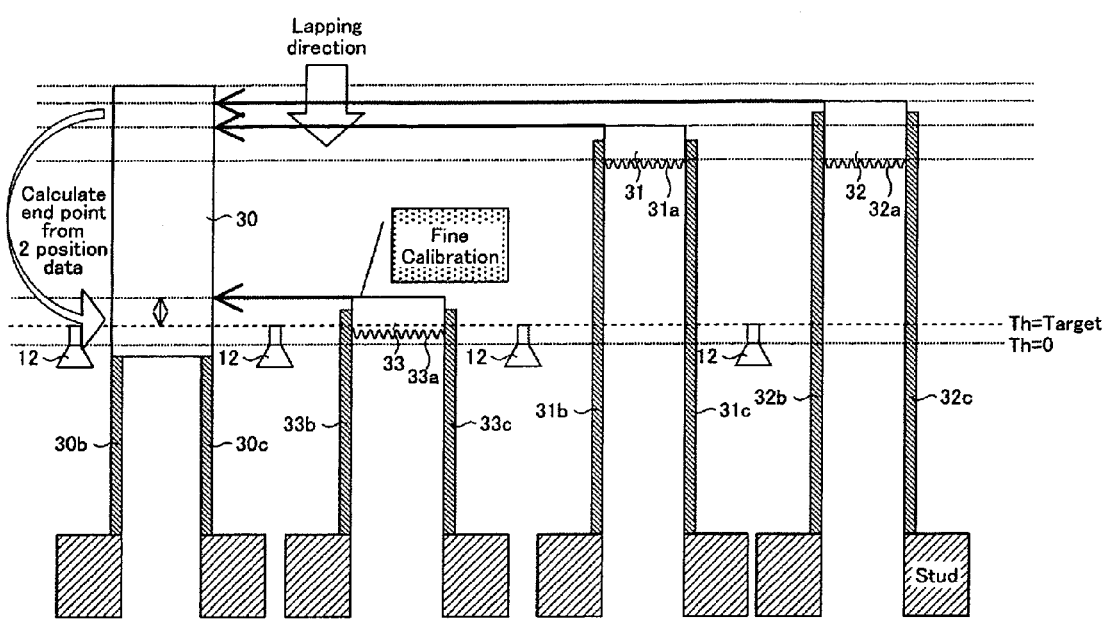
FIG. 1 is a diagram showing a configuration of write ELGs in an embodiment of the present invention, and a relationship in layout of the ELGs with respect to a main magnetic pole piece.
Figure 2:
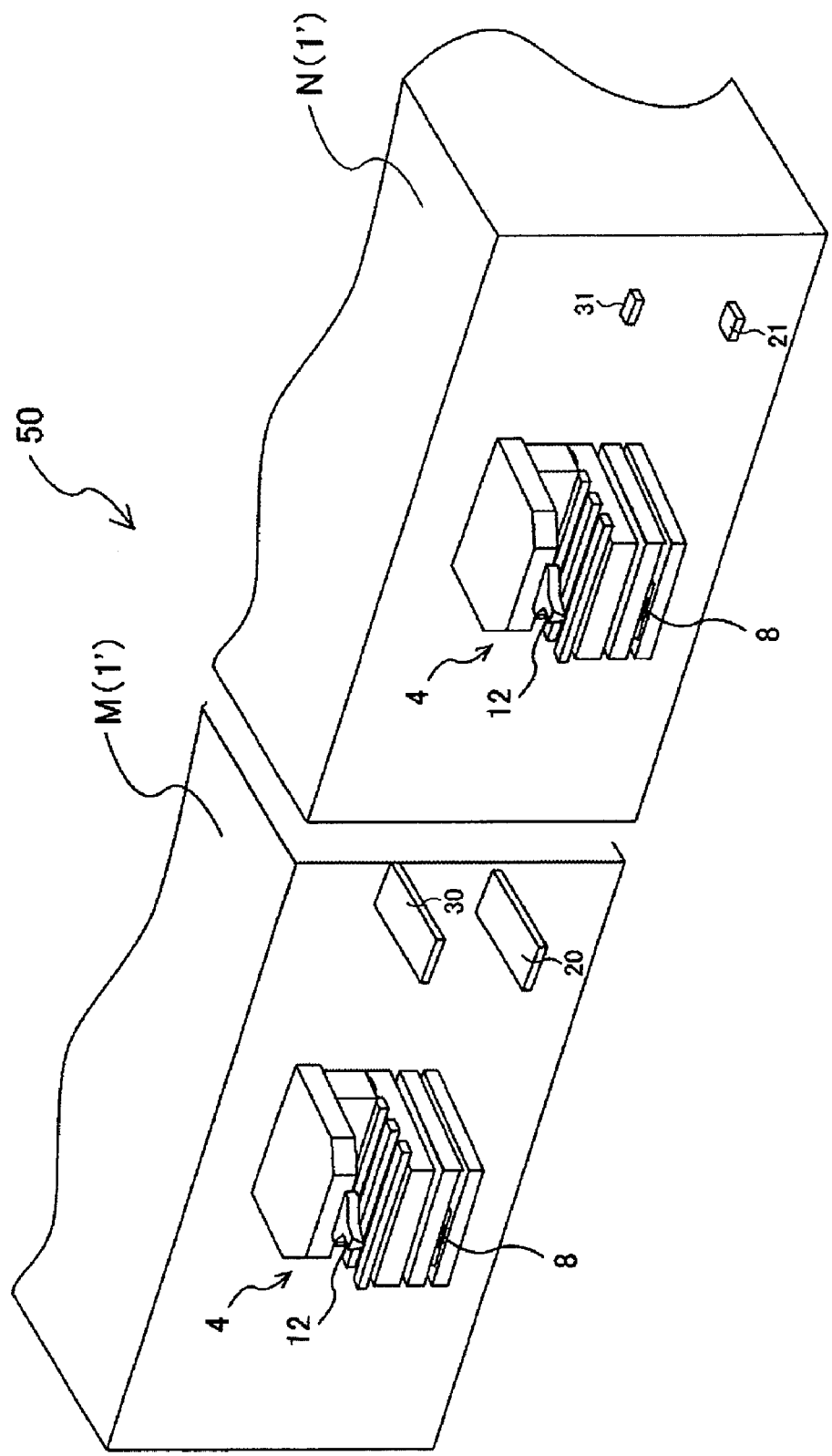
FIG. 2 is a perspective view showing an example of layout of the write ELGs and read ELGs in accordance with an embodiment of the present invention.
Figure 3:
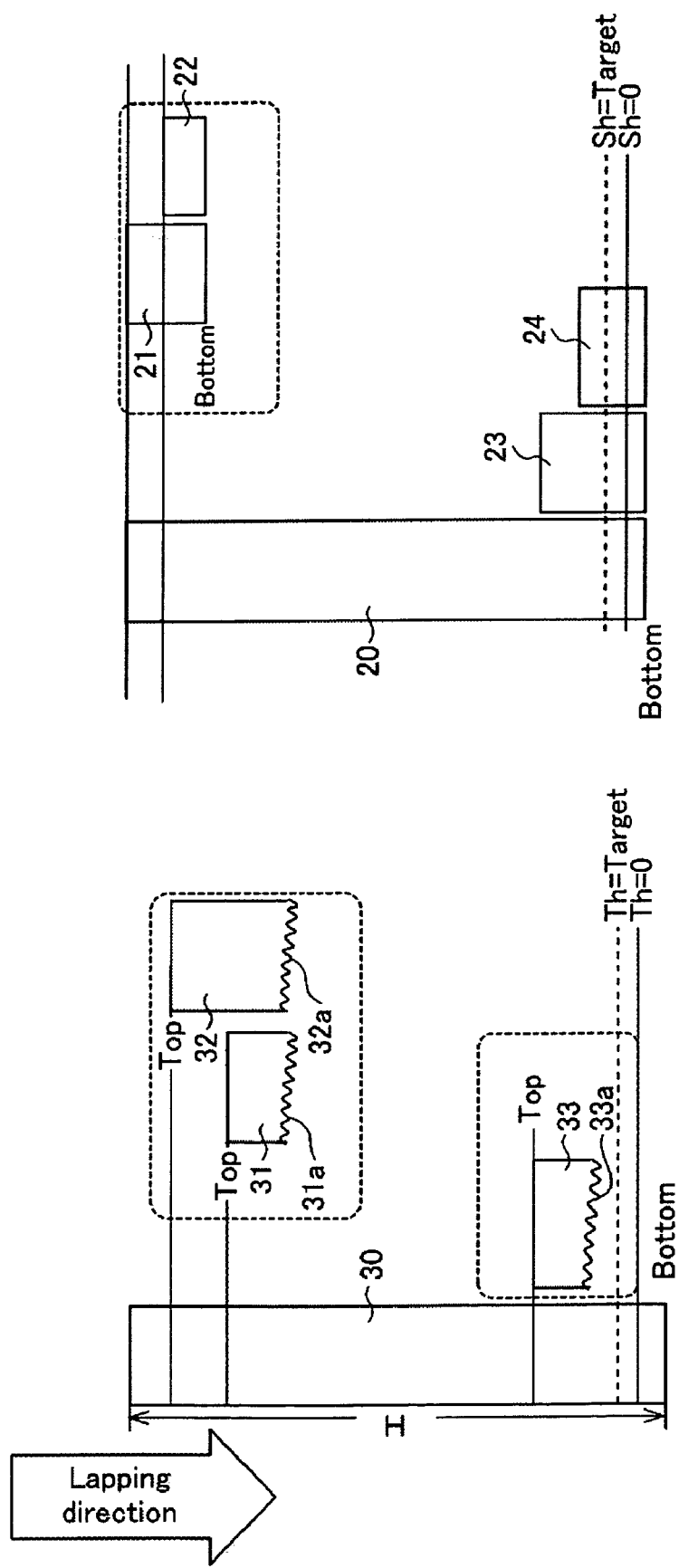
FIG. 3 is a diagram schematically showing the write ELGs and read ELGs existing when arranged on one plane in accordance with an embodiment of the present invention.

Step 100: In the step of forming a wafer, the read head 5 and the write head 9 are formed on wafer 40 by using a thin-film deposition process such as sputtering, ion milling, or photolithography. In addition, as shown in FIGS. 2 and 3, later-described detection patterns (ELGs) 20-24 for read head ABS processing are formed during the formation of the read element 8, and the detection patterns (ELGs) 30-33 for write head ABS processing are formed during the formation of the plated underlayer 15 of the trailing side shield 14 or during the formation of the trailing shield 16 and the main magnetic pole piece 12. Pattern shapes and layout of the write head ELGs 30-33 are shown in FIG. 1. For the ELGs 31-33, respective magnetic films are deposited by sputtering, then patterned, and etched by ion milling from the "Lapping direction" shown in FIG. 1. Since the front end positions of the ELGs 31-33 are thus defined, fragments 31a-33a of the lapped material stick to rear edges of the ELGs 31-33.

Step 111: In the step of cutting a row bar stack, the wafer 40 is cut and the row bar stack is sliced out therefrom by slicing with a diamond-cutting grinder. The row bar stack is an integrated set of rows. If a row bar equivalent to one row was lapped in next step, the row bar would bend, so a plurality of rows are sliced out as the row bar stack.

Step 112: In the step of lapping the air bearing surface, the air bearing surface of the row bar 50 located at one end of the row bar stack is pressed against a rotary lapping surface table and lapped to control the throat height "Th" and the sensor height "Sh". In this step, resistance values of the ELGs 20-24 and those of the ELGs 30-33 are detected for in-process measurement of element height during the lapping step. The air bearing surface lapping that uses the ELGs 20-24, 30-33, is detailed later herein.

Step 113: This final step of lapping the air bearing surface is executed to finish the air bearing surface by lapping for improved surface roughness and reduced differences in as-machined surface height.

Step 114: In the row bar cutting step, only the lapped row bar 50 of the row bar stack is sliced out by cutting. The row bar 50 is a concatenated set of about 50 head elements, measuring about 50 mm in length L and about 0.3 mm in thickness "t". The remainder of the row bar stack is returned to step 112, in which a lapped surface of a row bar to form another end is then processed.

Step 115: In the step of forming a protective film on the air bearing surface, a protective film 3 to 6 mm thick is formed to protect the read head 5 and write head 9 exposed to the air bearing surface. The protective film includes a silicon (Si) layer formed as a tight contact layer, and diamond-like carbon formed thereon.

Step 116: In the step of forming air bearing surface rails, an air bearing rail 17, a shallow-trench rail 18, and a deep-trench rail 19 are formed on the air bearing surface by grooving such as ion milling or reactive ion etching (RIE). More specifically, the row bar 50 is fixed to a rail-forming jig by use of a thermoplastic adhesive tape, then after the air bearing surface has been coated with a resist, exposed to light, and developed, sections other than the rails are removed by grooving. After this, resist residues present on the air bearing surface are detached. The two-level air bearing surface as shown in FIG. 12, this surface being inclusive of the air bearing rail 17, the shallow-trench rail 18, and the deep trench 19, can be formed by repeating all sub-steps from resist coating to resist detaching, twice.

Step 117: In the step of cutting sliders, the row bar 50 is cut for each head element and sliced out into individual magnetic head sliders 1 by slicing with a diamond-cutting grinder.

Step 118: During inspection, after the row bar 50 has been sliced out into the magnetic head sliders 1, characteristics of each write head 9 and each read head 5 are measured, each slider 2 is visually checked, and only nondefective sliders are selected.

Figure 6:
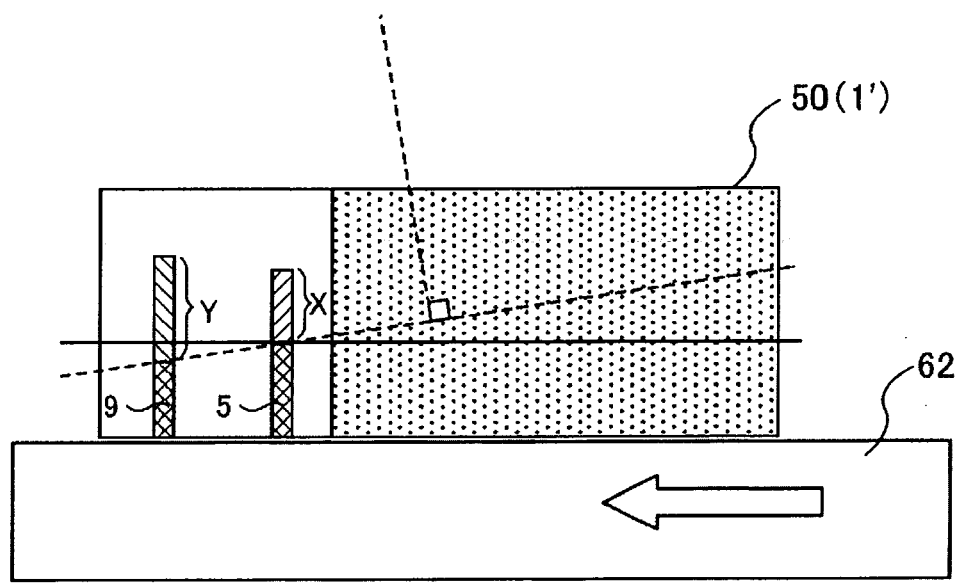
FIG. 6 is a sectional view of a magnetic head slider section on a row bar existing before an air bearing surface is lapped.
Figure 7:
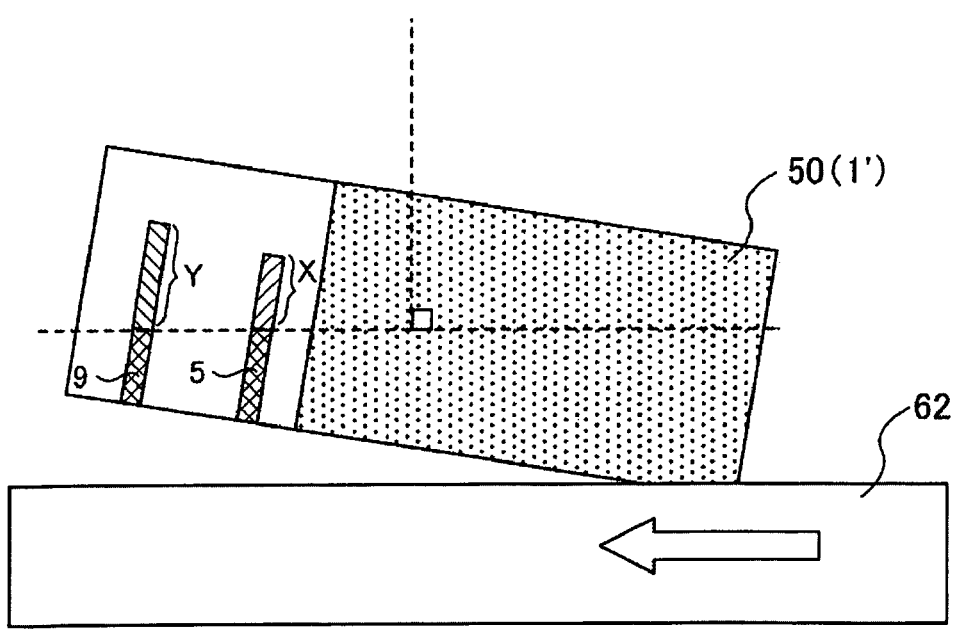
FIG. 7 is a sectional view of the magnetic head slider section having an inclined air inflow end of the row bar.
Figure 8:
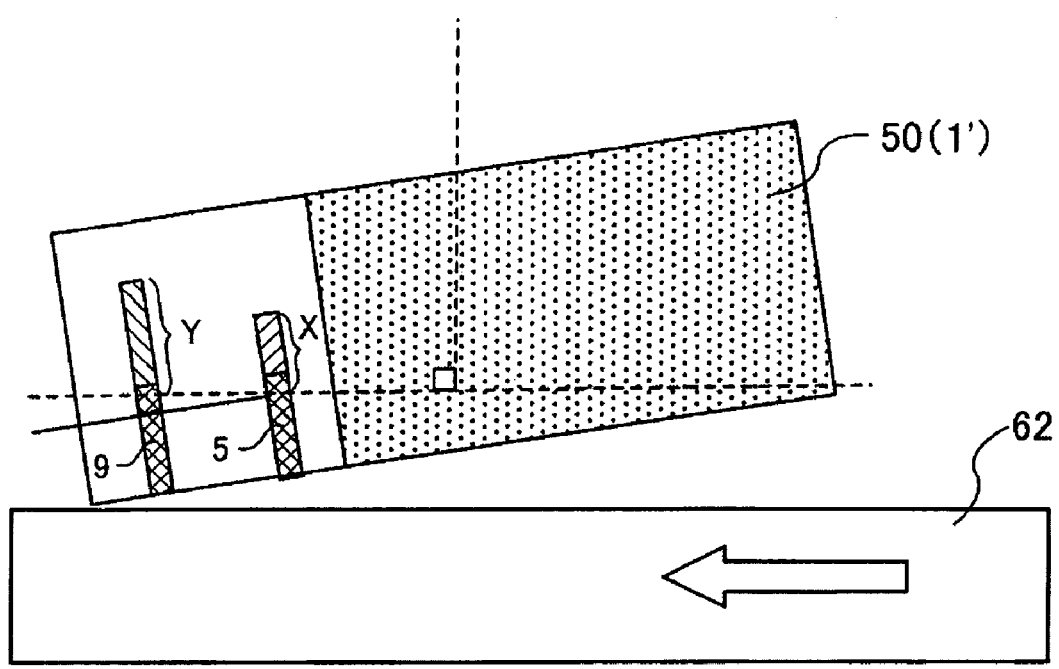
FIG. 8 is a sectional view of the magnetic head slider section having an inclined head element section end of the row bar.

Next, air bearing surface lapping step 112 described above is further detailed below. FIG. 6 is a sectional view of the row bar 50 with an unlapped air bearing surface (i.e., a magnetic head slider section 1'). If, as shown in FIG. 5, a mismatch between the write head 9 and the read head 5 has occurred in the wafer-forming step and the air bearing surface is formed by lapping a desired face of the row bar 50 (magnetic head slider section 1') in parallel as denoted by a solid line, when the sensor height "Sh" of the read head 5 matches a design dimension X, the throat height "Th" of the write head 9 will be too small for a design dimension Y. As shown in FIG. 7, lapping the row bar 50 with its air inflow end inclined to make the final ABS parallel to the lapping surface table 62, as denoted by a dotted line, the element heights of the read head 5 and the write head 9 can be controlled exactly to the design dimensions X and Y, respectively. In addition, the position of the write head 9 and that of the read head 5 may mismatch in a direction reverse to that shown in FIG. 6. In this case, the element heights of the read head 5 and the write head 9 can be controlled exactly to the design dimensions X and Y by lapping the row bar 50 inclinedly for the head element section to approach the lapping surface table 62, as shown in FIG. 8.

Figure 9:
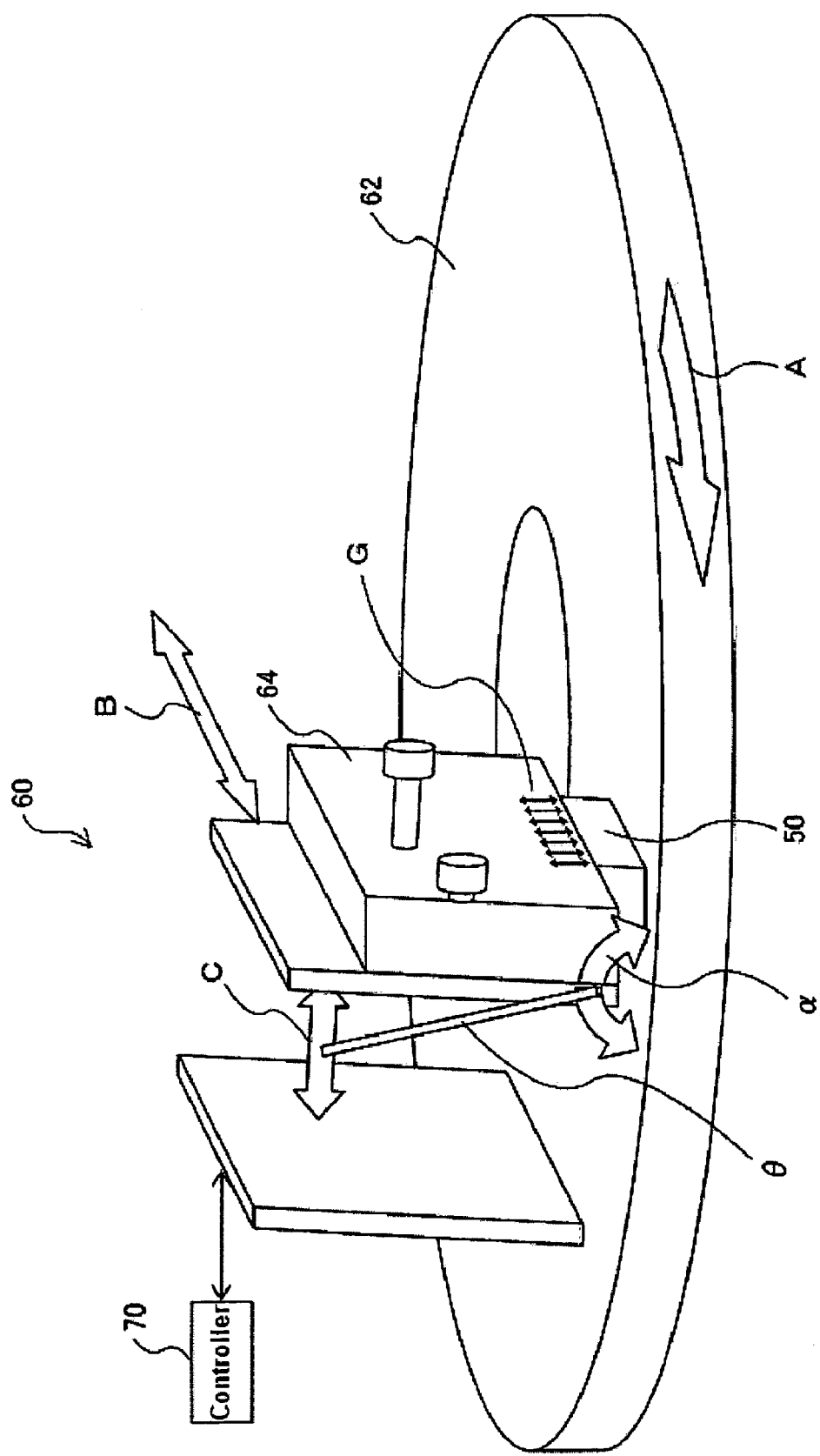
FIG. 9 is a schematic configuration of an air bearing surface lapping device applied to the embodiments of the present invention.
Figure 10:
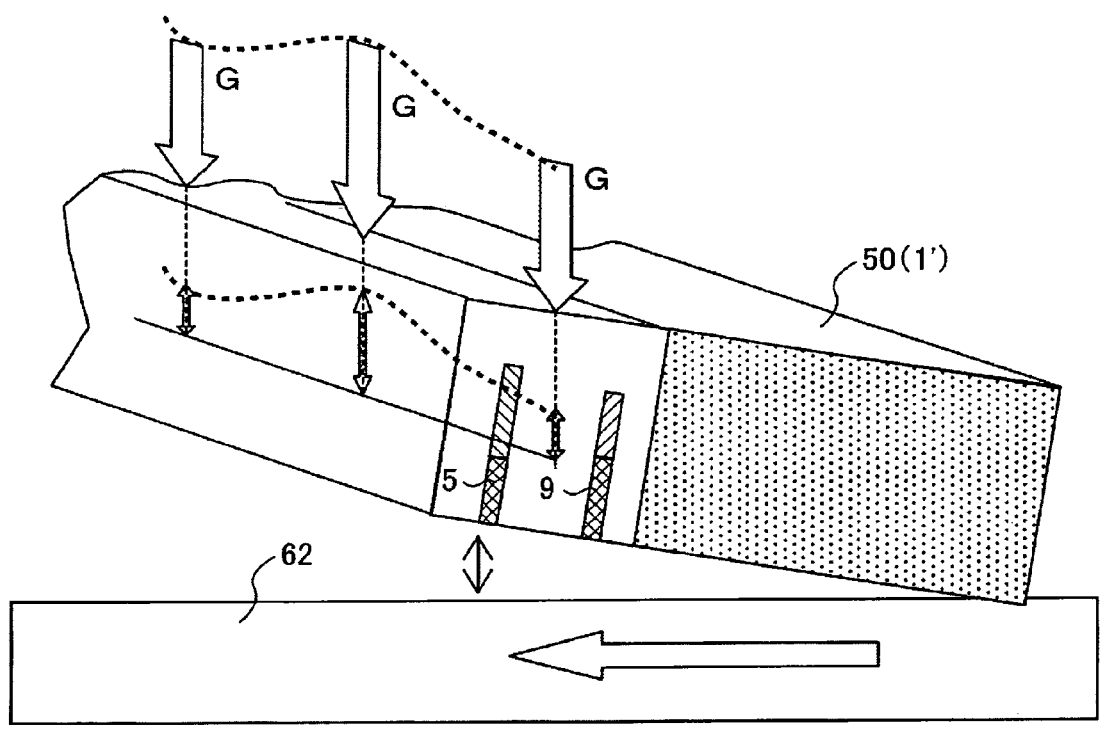
FIG. 10 is a diagram showing how an unbalanced load is applied to the row bar.

A schematic configuration of an air bearing surface lapping device is shown in FIG. 9. The lapping device 60 includes a soft, metallic surface table (lapping surface table) 62 based mainly on silver, and a lapping jig 64 used to hold the row bar stack (or magnetic head sliders) to be lapped. The lapping surface table 62 rotates in a direction of arrow A at a speed of 10-70 rev/min, and the lapping jig 64 oscillates in radial direction B of the lapping surface table 62 at a speed of 20-60 mm/sec. The lapping jig 64 adjusts an inclination angle θ of the row bar 50 by inclining in circumferential direction C of the lapping surface table 62. The lapping device 60 also has an oscillating unit that oscillates the row bar stack in a longitudinal direction of the slider at oscillation pitches α. Additionally, the lapping device 60 has a lapping load controller actuated by a voice coil, an air cylinder, or the like, to apply an unbalanced load G to the row bar stack for a distributed amount of internal processing of the row bar 50, as shown in FIG. 10, and control the element heights by controlling the distributed amount of processing.

Referring back to FIG. 9, a description is given of lapping, in which the row bar stack is first fixed to the lapping jig 64 by waxing or the like and then the surface to be lapped (i.e., the air bearing surface) is pressed against the lapping surface table 62. Next, in order to ensure machining efficiency and improve air bearing surface roughness, lapping with an oily lapping liquid which contains diamond abrasive grains is continued until the write head 9 and the read head 5 have approached respective desired element heights. After that, lapping by drip-feeding of an oily lapping liquid free from diamond abrasive grains is further continued for the write head 9 and the read head 5 to reach the desired element heights.

The lapping device 60 has a connected controller 70, which detects the resistance values of the ELGs 20-24 and 30-33 in order to conduct in-process element height measurements during lapping. Each ELG resistance value is detected by supplying a constant current to the ELG and detecting a voltage developed between terminals. The controller 70 also controls rotation of the lapping surface table 62, the oscillating motion of the lapping jig 64, the inclination angle θ of the row bar 50, the lapping load, and supply rates of the lapping liquids.

FIG. 2 shows an example of layout of the processing detection patterns (ELGs) for controlling the throat height "Sh" and sensor height "Sh" of the perpendicular recording magnetic head 4 during air bearing surface lapping of the row bar 50 (magnetic head slider sections 1'). The write ELG 30 of one magnetic head slider section M (1') included in the row bar 50 is disposed on the same layer of the slider section M as the plated underlayer 15 of the trailing side shield 14, and the read ELG 20 is disposed on the same layer as that of the read element 8. The write ELG 31 of another magnetic head slider section N (1') included in the row bar 50 is disposed on the same layer of the slider section N as that of the main magnetic pole piece 12, and the read ELG 21 is disposed on the same layer as that of the read element 8.

The write ELGs 30-33 and the read ELGs 20-24 when arranged on one plane are schematically shown in FIG. 3 for ease in understanding the pattern shapes and layout of the ELGs. The ELG 30 is a detection pattern for monitoring the element height of the main magnetic pole piece 12, and height section H of the ELG 30 is formed to be extended from a "Bottom" position deeper than the flare point (throat height "Th"=0) of the main magnetic pole piece 12, to a position closer to the air bearing surface than to the front end (Top) position of the ELG during the formation of the main magnetic pole piece 12. Also, the ELG 30, a resistive film formed on the same layer as the plated underlayer 15 of the trailing side shield 14, is likely to suffer a pattern error (a shift in position) with respect to the main magnetic pole piece 12. Forming the ELG 30 and the plated underlayer 15 of the trailing side shield 14 on the same layer makes it possible to form the resistive film ELG 30 having a film thickness suitable for measurement. The ELGs 31, 32, 33 are each a resistive film formed on the same layer as that of the main magnetic pole piece 12, and the front end (Top) position of the ELG 31, 32, 33 has a correlation with respect to the throat height of the main magnetic pole piece 12. During front-end position determination of the ELGs 31, 32, 33 by ion milling, fragments 31a-33a of the lapped material re-stick to the rear edges of the ELGs 31-33 that are located at a side opposite to the air bearing surface. The resistance values of the ELGs 31, 32, 33, therefore, become nonuniform. Also, the width in the direction of the throat height extends in an opposite (reverse) direction from the air bearing surface during ion milling. Accordingly, the front end of the ELG that faces the air bearing surface likewise moves in the extending direction of the throat height and has a high correlation. The front end (Top) is a face subjected to ion milling, and almost no fragments of the lapped material re-stick to the front end. The front end is thus maintained in a very close relationship in relative position with respect to the throat height "Th".

A more specific configuration of the write ELGs 30-33 and the layout relationship of each with respect to the main magnetic pole piece 12 of the write head are shown in FIG. 1. Lead wires 30b, 30c are connected to the write ELG 30, and the controller 70 (see FIG. 9) detects a voltage developed between the lead wires 30b, 30c and converts the voltage into a resistance value. Similar lead wires are also connected to each ELG 31, 32, 33, and the controller 70 detects a voltage developed between the lead wires and converts the voltage into a resistance value. As lapping progresses, the controller 70 can calculate an ending position of the lapping operation from two sets of front end position (Top) data by detecting the front end positions (Tops) from changes in the resistance values of the ELGs 31, 32. That is to say, since the relationship in relative position between the front end positions (Tops) of the ELGs 31, 32 and the throat height "Th" is accurate, it is possible to detect the resistance value of the ELG 30 existing when the front end positions (Tops) of the ELGs 31, 32 are detected. Thus, it is further possible to assign a correlation to the throat height "Th" of the main magnetic pole piece 12 and the resistance value of the ELG 30, and hence to calculate the ending position of lapping of the ELG 30. In addition, detecting the front end position (Top) of the ELG 33 makes it possible to detect the fact that the throat height "Th" of the main magnetic pole piece 12 has approached the desired dimension, and precisely adjust the correlation between the resistance value of the ELG 30 and the throat height "Th". In this manner, it becomes possible, by monitoring the write ELGs 30-33, to correct any shifts in position between the ELG 30 and the main magnetic pole piece 12, accurately measure the throat height "Th" of the main magnetic pole piece 12, and lap the throat height section with high accuracy.

Incidentally, the ELGs 31, 32, 33 are also detection patterns used to adjust the inclination angle (Wedge Angle) θ of the row bar 50. For split formation of the trailing side shield 14 into a side shield and a trailing shield, when the trailing shield is formed, the write ELG 30 is desirably formed on the layer including the trailing shield. For provision of the trailing shield 16 instead of the trailing side shield 14, the write ELG 30 is desirably formed on the layer including the trailing shield 16.

Figure 4:
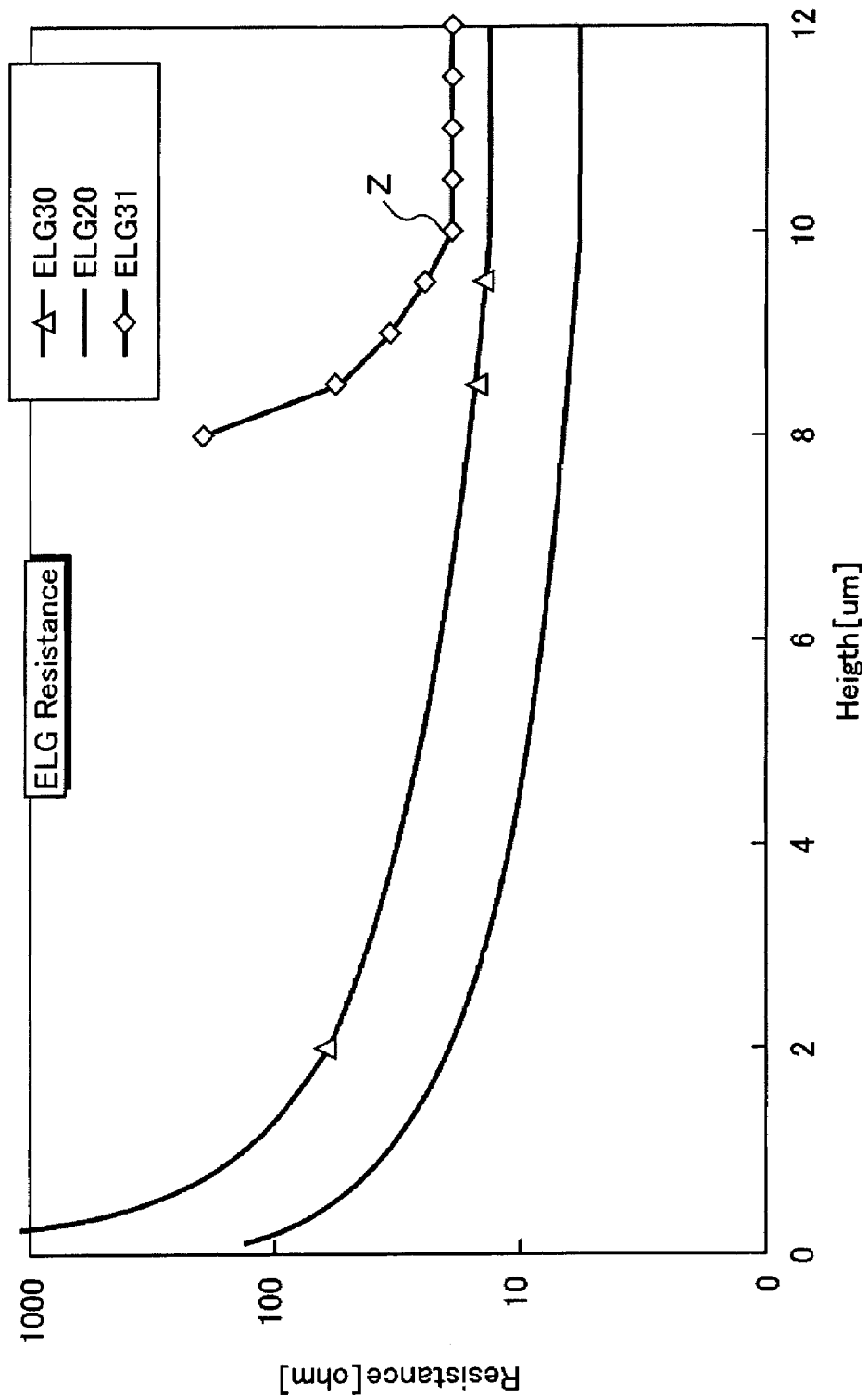
FIG. 4 is a diagram showing a relationship between element heights (Heights) of a main magnetic pole piece and a read element, and changes in resistance of each ELG.

A method of detecting the front end positions (Tops) of the ELGs 31, 32, 33, is described below. FIG. 4 shows a relationship between the element heights (Heights) of the main magnetic pole piece 12 and read element 8 and changes in the resistance of each ELG. The resistance changes, shown in FIG. 4, shift from the right of the figure to the left. The write ELG 30 and the read ELG 20 exist at up to positions of the throat height "Th"=0 and the sensor height "Sh"=0, respectively, so the resistance value of each ELG changes until the element height (Height) has become zero (0). Since the ELGs 31, 32, 33 have their rear edges set to be closer to the air bearing surface than to the ELG 30, lapping down to the rear edge will result in the ELGs 31, 32, 33 disappearing and each resistance value becoming a maximum. It is possible to estimate a inflection point Z from the resistance change curve of the ELG 31 in FIG. 4 and detect the front end position (Top) of the ELG 31 from the inflection point Z.

Referring back to FIG. 3, a description is given of the ELGs 20-24 for the read element. Of these ELGs, the ELGs 20, 23, 24 are detection patterns for monitoring the sensor height "Sh" of the read element 8, and the ELGs 21, 22 are detection patterns for adjusting the inclination angle (Wedge Angle) θ of the row bar 50. Rear edges of the ELGs 21, 22 have a correlation with the sensor height "Sh". The sensor height "Sh" of the read element 8 can be controlled with high accuracy by monitoring the read element ELGs 20-24.

In the above embodiment, the ELGs 30-33 are provided as the processing detection patterns for the write head, and the ELGs 20-24, as the processing detection patterns for the read head. In terms of principle, however, desired processing accuracy can be attained if the row bar 50 has one ELG 20 on the layer including the read element, one ELG 30 on the layer including the plated underlayer of the shield, and a plurality of ELGs on the layer including the main magnetic pole piece. If the ELGs including the main magnetic pole piece are to be used only to confirm a pattern error (shift in position) between the ELG 30 including the plated underlayer of the shield, and the main magnetic pole piece 12, the number of ELGs used for this purpose can be one. Processing accuracy can likewise be enhanced if the ELG 20 on the layer including the read element, and the ELG 30 on the layer including the plated underlayer of the shield are distributedly arranged in a plurality of positions in the row bar.

As described above, the method of manufacturing the magnetic head slider according to the above embodiments of the present invention allows highly accurate lapping control of the throat height "Th" section of the main magnetic pole piece 12 by, in the air bearing surface lapping step, detecting the front end position of each ELG having a correlation with the throat height "Th" section of the main magnetic pole piece, and correcting any shifts in position with respect thereto due to pattern errors.

While the row bar has been subjected to air bearing surface lapping in the above embodiment, the row bar may be cut and separated into individual magnetic head sliders and then the same lapping process as the above may be performed on each of the magnetic head sliders. To lap the magnetic head sliders, there is a need to provide the above read head ABS-processing detection patterns and write head ABS-processing detection patterns on each of the magnetic head sliders. Air bearing surface lapping is followed by the final lapping of the air bearing surface, the formation of an air bearing surface protective film, the formation of an air bearing surface rail, and inspection. Essentially the same advantageous effects as in the above embodiment can also be obtained in that case.

What is claimed is:

1. A method for manufacturing a magnetic head slider, the method comprising the steps of:
    a first step of forming on a wafer, a plurality of read heads each including a read element, and a processing detection pattern for a read operation;
    a second step of forming on each of the plurality of read heads, a plurality of write heads each including an auxiliary magnetic pole piece, a main magnetic pole piece, a coil, and a shield provided at a trailing side of the main magnetic pole piece, a plurality of first processing detection patterns each formed on the same layer as a plated underlayer adapted for forming the shield by using a plating method, and a plurality of second processing detection patterns each formed on a layer including the main magnetic pole piece;
    a third step of cutting the wafer into a plurality of row bars;
    a fourth step of lapping independently a surface of each of the row bars by pressing the surface of the row bar against a rotary lapping surface table, then oscillating the row bar in a radial direction of the lapping surface table, and lapping the surface while detecting a resistance value of the processing detection pattern for the read operation and resistance values of each of the first and second processing detection patterns, the fourth step further including the steps of detecting a front end position of the second processing detection pattern, assigning a correlation between element height of the main magnetic pole piece and the resistance value of the first processing detection pattern, and lapping the surface of the row bar while detecting the resistance value of the first processing detection pattern; and
    a fifth step of cutting the row bar into individual magnetic head sliders by grooving an air bearing surface after the fourth step of lapping.

2. The method for manufacturing a magnetic head slider according to claim 1, wherein the slider includes, in a plurality of positions for one row of row bar space, the second processing detection pattern whose front end position is formed at different positions in a direction of element height.

3. The method for manufacturing a magnetic head slider according to claim 1, wherein the first processing detection pattern is formed in a plurality of positions for one row of row bar space.

4. The method for manufacturing a magnetic head slider according to claim 3, wherein an ending position of lapping of the first processing detection pattern is calculated by detecting each of front end positions of the second processing detection pattern having the front end positions formed at different positions in the direction of the element height.

5. The method for manufacturing a magnetic head slider according to claim 1, wherein, in the second step:
    the main magnetic pole piece of each of the plurality of write heads and the plurality of second processing detection patterns have respective magnetic films first deposited by sputtering, then patterned, and ion-milled for a lower face of each of the magnetic films to be shorter than an upper face thereof, and the front end position of the second processing detection pattern is determined by ion milling.

6. The method for manufacturing a magnetic head slider according to claim 5, wherein, in the fifth step:
    during a time interval from completion of the lapping step to a start of air bearing surface grooving, of all the plural row bars, only one lapped row of row bar space is cut, the air bearing surface grooving operation is performed on the cut row of row bar space, and the fourth step is performed on the row bars remaining uncut.

7. The method for manufacturing a magnetic head slider according to claim 5, wherein width of the first processing detection pattern in a direction of element height thereof is greater than width of the second processing detection pattern in the direction of the element height thereof.

8. The method for manufacturing a magnetic head slider according to claim 5, wherein the shield surrounds an upper face and lower face of the main magnetic pole piece.

* * * * *